US006997016B2

(12) United States Patent
Moriya et al.

(10) Patent No.: US 6,997,016 B2

(45) Date of Patent: Feb. 14, 2006

(54) METHOD AND APPARATUS FOR MANUFACTURING GLASS TUBE

(75) Inventors: Tomomi Moriya, Kanagawa (JP); Masashi Onishi, Kanagawa (JP); Kazuyuki Sohma, Kanagawa (JP); Masaaki Hirano, Kanagawa (JP); Eiji Yanada, Kanagawa (JP); Tadashi Enomoto, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/796,052

(22) Filed: Mar. 10, 2004

(65) Prior Publication Data

US 2004/0231361 A1 Nov. 25, 2004

Related U.S. Application Data

(63) Continuation of application No. PCT/JP03/00841, filed on Jan. 29, 2003.

(30) Foreign Application Priority Data

| | | |
|---|---|---|
| Jan. 30, 2002 | (JP) | P2002-022444 |
| Jan. 30, 2002 | (JP) | P2002-022451 |
| Jan. 30, 2002 | (JP) | P2002-022566 |
| Feb. 5, 2002 | (JP) | P2002-028779 |
| Jul. 10, 2002 | (JP) | P2002-201861 |
| Aug. 9, 2002 | (JP) | P2002-233926 |

(51) Int. Cl.
*C03B 23/26* (2006.01)
*C03B 23/045* (2006.01)

(52) U.S. Cl. ......................... 65/29.12; 65/105; 65/109; 65/110; 65/161; 65/296; 65/393; 65/439

(58) Field of Classification Search .................... 65/86, 65/87, 105, 108, 109, 174, 276, 277, 279, 65/282, 283, 292, 296, DIG. 9, 29.12, 110, 65/161, 393, 439; 76/108.1
See application file for complete search history.

(56) References Cited

U.S. PATENT DOCUMENTS

| | | | | |
|---|---|---|---|---|
| 3,293,018 A | * | 12/1966 | Doty | 65/109 |
| 3,660,062 A | * | 5/1972 | Keller | 117/51 |
| 4,350,513 A | * | 9/1982 | Coucoulas et al. | 65/29.12 |
| 5,785,729 A | * | 7/1998 | Yokokawa et al. | 65/385 |
| 5,837,334 A | | 11/1998 | Yokokawa et al. | |

(Continued)

FOREIGN PATENT DOCUMENTS

JP 62-162632 7/1987

(Continued)

*Primary Examiner*—Sean Vincent
(74) *Attorney, Agent, or Firm*—McDermott Will & Emery LLP

(57) ABSTRACT

Stress exerted on an inner or outer circumferential side of a glass tube 6 is controlled when a glass material 3 is heated and softened by a heating element 41 provided around the glass material 3 and a piercing plug 31 is relatively pressed into a softened region of the glass material 3 to thereby form the glass material 3 into the glass tube 6 gradually. For example, the control of the stress can be carried out by controlling an internal or external pressure of the glass tube 6. As a result, the deformation of the glass tube 6 just after piercing is prevented so that the glass tube 6 can be obtained with high quality. It is also possible to solve the problem that cracks may occur easily at the time of reheating because of residual stress distribution after cooling.

12 Claims, 11 Drawing Sheets

U.S. PATENT DOCUMENTS

| | | | | |
|---|---|---|---|---|
| 2002/0069672 | A1 * | 6/2002 | Knieling et al. | 65/105 |
| 2003/0046956 | A1 * | 3/2003 | Anderson et al. | 65/108 |

FOREIGN PATENT DOCUMENTS

| | | | |
|---|---|---|---|
| JP | 63-40735 | * | 2/1988 |
| JP | 03-247525 | | 11/1991 |
| JP | 04-26522 | A | 1/1992 |
| JP | 10-101352 | | 4/1998 |
| JP | 1 061 055 | A1 | 12/2000 |
| JP | 100 44 715 | C1 | 12/2001 |
| JP | 2002-12433 | A | 1/2002 |

* cited by examiner

METHOD AND APPARATUS FOR MANUFACTURING GLASS TUBE

This is a continuation of Application No. PCT/JP03/00841, filed Jan. 29, 2003.

TECHNICAL FIELD

The present invention relates to a method and an apparatus for manufacturing a glass tube. More particularly, it relates to a method and an apparatus for manufacturing a glass tube in such a manner that a piercing plug is pressed into a softened glass material to thereby form the glass material into the glass tube gradually.

BACKGROUND ART

There is a method for manufacturing a cylinder of quartz glass by drawing out a circumferential edge of an end of a columnar quartz glass rod while rotating the rod relatively to a piercing member in the condition that the end of the rod is heated and softened while the rod is rotated about its longitudinal axis, and a sharp edge of the piercing member is engaged with a central portion of a surface of the end of the rod (Japanese Patent No. 2798465). According to this method, as shown in FIG. 12, a glass rod 100 made of quartz is prepared. A dummy cylinder 123 is welded to an exit side end surface of the glass rod 100. In the condition that a piercing plug 131 is applied to a central portion of the end surface of the glass rod 100 while the glass rod 100 supported by the dummy cylinder is rotated, part of the glass rod 100 around an end of the piercing plug 131 is heated and softened by heating means 140. The piercing plug 131 is fixed to a support rod 132. The support rod 132 is fixed to a fixing portion 135 so that the support rod 132 can rotate about its axis along with the piercing plug 131. A left end of the glass rod 100 is held by a chuck 112 of a first feed table 111. The other end of the glass rod 100 is held by a chuck 122 of a second feed table 121 through the dummy cylinder 123. The first and second feed tables 111 and 121 are mounted on an entrance side base 110 and an exit side base 120 respectively so that the first and second feed tables 111 and 121 can move on the bases respectively.

The heating means 140 is configured to have a cylindrical heating element 103*a* that covers the neighborhood of an abutment portion where the glass rod 100 and the piercing plug 131 abut on each other, and a coil 103*b* having an appropriate number of turns and disposed around the outer circumference of the heating element 103*a*. Heat induced by a high frequency current passed through the coil 103*b* raises the temperature of the heating element 103*a* to a value equal to or higher than the softening point of the glass rod 100 to thereby heat part of the glass rod 100 in the neighborhood of the abutment portion of the piercing plug 131.

DISCLOSURE OF THE INVENTION

The invention provides a method of manufacturing a glass tube, wherein stress exerted on an inner or outer circumferential side of the glass tube is controlled when a columnar or cylindrical glass material is heated and softened by a heating element disposed around the glass material and when a piercing plug is relatively pressed into a softened region of the glass material to thereby form the glass material into the glass tube gradually. The control of the stress can be carried out by controlling an internal or external pressure of the glass tube. Alternatively, the control of the stress can be carried out so that a pressure at which the piercing plug is relatively pressed into the softened region of the glass material is detected and a detection signal of the pressure is fed back for adjusting the quantity of heat generated by the heating element to keep the pressure constant. Alternatively, the control of the stress can be carried out by heating the piercing plug to a temperature of not lower than the softening point of the glass material.

A supporting pipe may be welded to at least one end of the columnar or cylindrical glass material so that the glass material can be formed into the glass tube gradually while supported by the supporting pipe.

The piercing plug may have a tapered end, and a cylindrical or columnar portion with a constant outer diameter starting from the middle of the piercing plug, so that the glass material can be cooled to a temperature at which a sectional shape of the glass material is self-sustained while the softened glass material comes into contact with the columnar or cylindrical portion of the piercing plug inserted into the glass material.

The glass material can be formed into the glass tube gradually by the piercing plug which is supported by a support jig having a gradient diameter portion whose outer diameter gradually decreases as the distance from the piercing plug increases.

A positioning dent configured so that it can guide the piercing plug to a predetermined position may be provided in an end surface of the columnar or cylindrical glass material so that the glass material can begin to be formed into the glass tube gradually in the condition that the piercing plug is made to abut on the positioning dent.

The invention also provides an apparatus characterized in that: a columnar or cylindrical glass material is heated and softened by a heating element disposed to surround the glass material and a piercing plug is pressed into a softened region of the glass material to thereby make it possible to form the glass material into the glass tube gradually; and the apparatus includes pressure detecting means for detecting the pressure at which the piercing plug is pressed into the glass material, and a controller for controlling the quantity of heat generated by the heating element on the basis of a detection signal fed back from the pressure detecting means to keep the pressure constant.

BRIEF DESCRIPTION OF THE DRAWINGS

FIG. 2(*b*) is a view showing an air supply portion; and FIG. 2(*c*) is a view showing an air discharge portion.

BEST MODE FOR CARRYING OUT THE INVENTION

Figure 1:
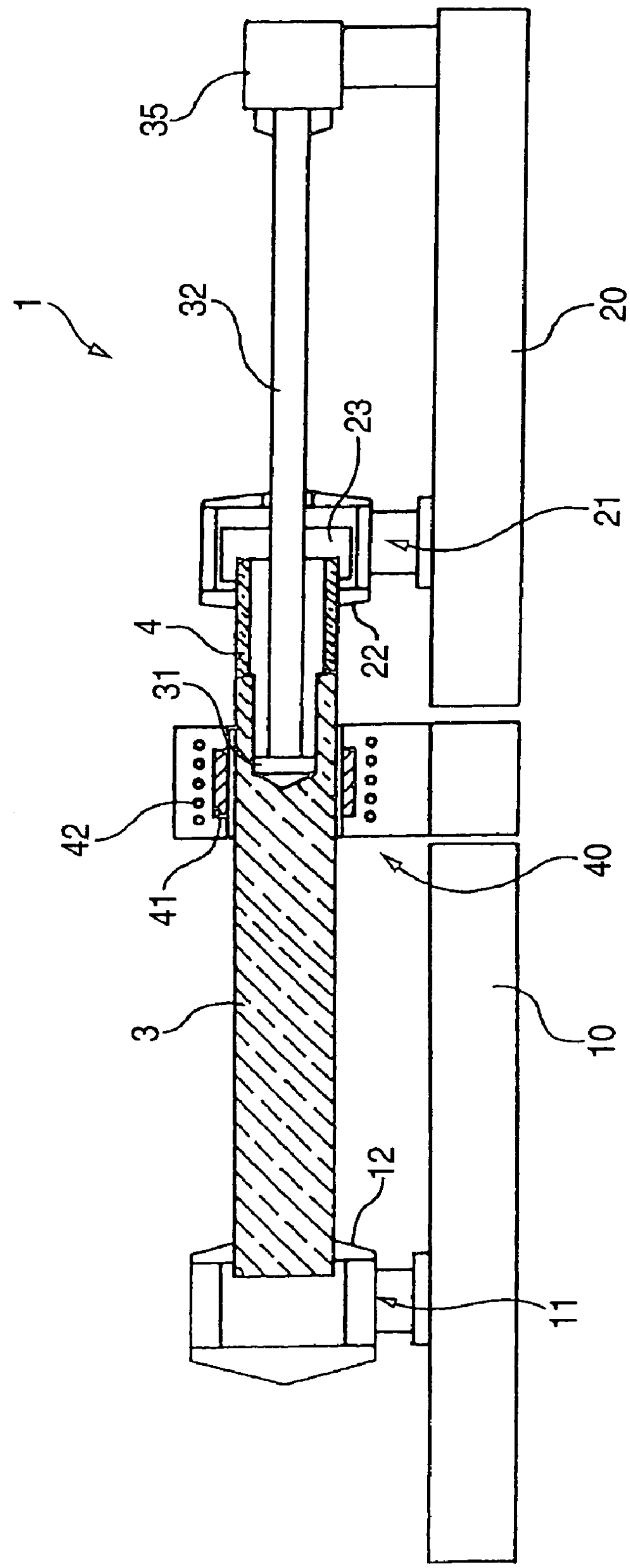
FIG. 1 is a view for explaining a method for manufacturing a glass tube according to an embodiment of the invention.

Glass materials to be used in the invention specifically include columnar glass rods, cylindrical glass pipes, and the like, finished in predetermined dimensions according to appropriate manufacturing methods. The term "piercing" used herein implies not only forming a hole in a columnar glass material but also increasing an inner diameter of a hole in a cylindrical glass material. While a high frequency induction furnace, an electric resistance furnace, or the like, may be used as heating means, the high frequency induction furnace high in rate of temperature increase/decrease is preferred because it allows highly accurate control. For relatively pressing a piercing plug into a glass material, it is preferable that the glass material is pushed toward the piecing plug while rotated in the condition that the piercing plug is fixed in heating means.

In the invention, it is desirable to control an internal or external pressure of a glass tube. It is also desirable to perform control to keep a pressure deviation between the internal pressure and the external pressure of the glass tube substantially constant.

The glass tube is apt to be deformed just after it is pierced by the piercing plug because the temperature of the glass tube is equal to or higher than its softening point. For this reason, the shape of the glass tube is distorted by its own weight, etc., to bring a situation that it is difficult to obtain inner and outer diameters uniform in the lengthwise direction. In particular, because the glass material is heated and softened from its surroundings, the glass material during piercing is provided so that the temperature of an outer circumferential portion of the glass material is higher than that of a central portion of the glass material. During piercing, an inner circumferential portion of a hole formed by the piercing is cooled because it comes into contact with the piercing plug. Conventionally, these factors caused large variation in temperature distribution in the radial direction of the glass tube just after piercing because the temperature of the outer circumferential portion of the glass tube became higher than that of the inner circumferential portion of the glass tube. As a result, the shape of the glass tube was apt to be distorted because of the variation in temperature in the process in which the softened glass tube was cooled. Therefore, in most cases, it was necessary to form the glass tube once more in a process after piercing. On the other hand, residual stress after cooling was distributed because processing glass viscosity varied in a portion where the shape of the glass material slightly changed. As a result, there was also a problem that cracks were apt to occur at the time of reheating.

In the invention, it is desirable that the pressure at which the piercing plug is pressed into the glass material at a constant speed is detected and that a detection signal of the pressure is fed back so that the quantity of heat generated by the heating element is controlled to keep the pressure constant. In this case, the glass tube manufacturing apparatus includes a heating element provided to surround the columnar or cylindrical glass material, a piercing plug, pressure detecting means, and a controller. The glass material is heated and softened by the heating means. The pressure at which the piercing plug is pressed into the glass material is detected by the pressure detecting means. While the controller controls the quantity of heat generated by the heating element on the basis of the detection signal fed back from the pressure detecting means to keep the pressure constant, the piercing plug is pressed into the softened region of the glass material to thereby form the glass material into the glass tube gradually. The pressure at which the piercing plug is pressed into the glass material can be detected by use of a load sensor such as a load cell. Alternatively, the pressure may be detected on the basis of electric power consumed in order to drive means for moving the piercing plug or the glass material.

In the glass tube manufacturing method or apparatus configured as described above, since the softened state of the glass material can be judged from the pressure at which the piercing plug is relatively pressed into the glass material, the quantity of heat generated by the heating element can be reduced to decrease the temperature of the glass material to thereby suppress softening when the pressure is low. Alternatively, the quantity of heat generated by the heating element can be increased to increase the temperature of the glass material to thereby intensify softening more when the pressure is high. Accordingly, in the glass tube manufacturing method, the glass material to be pierced can be made in a proper softened state and uniform in viscosity. Thus, stress exerted on the inner circumferential side of the glass tube can be controlled to have a constant value. As a result, it is possible to solve the problem that cracks are apt to occur at the time of reheating because residual stress after cooling is distributed, or that variability of characteristic in the longitudinal direction of an optical fiber manufactured of the glass tube is deteriorated because dimensional accuracy after processing deteriorates.

In the invention, it is desirable to heat the piercing plug to a temperature equal to or higher than the softening point of the glass material. As a method for heating the piercing plug, when, for example, the glass material heated in an induction heating furnace is to be pierced by the piercing plug mainly containing black lead, the thickness of the heating element disposed around the glass material may be reduced so that induction heat can be also applied on the piercing plug. Alternatively, the frequency of a high frequency current used for the induction heating furnace may be reduced to 10 kHz or lower so that induction heat can be applied on the piercing plug. Alternatively, the electric resistance value of at least one of the heating element disposed around the glass material and the piercing plug may be set to be an arbitrary value so that induction heat can be applied on the piercing plug. Alternatively, part of the heating element disposed around the glass material may be formed to have a shape allowing magnetic flux to act directly on the piercing plug, e.g., a shape having a gap, so that induction heat can arise on the piercing plug. Alternatively, induction heat may be dispensed with so that resistance heat can be applied directly on the piercing plug.

Preferably, the piercing plug contains black lead and is surface-coated so that at least part of the piercing plug being contact with the glass material contains any one of silicon carbide, pyrolytic carbon and metal carbide. Preferably, the black lead contained in the piercing plug includes an impurity ion content of 1 ppm or lower.

A supporting pipe may be welded to at least one end of the columnar or cylindrical glass material so that the glass material can be formed into the glass tube gradually while supported by the supporting pipe.

If the glass material is held directly, there is the possibility that a surface of the held portion may be scratched or contaminated or that the diameter of a hole in the held portion cannot be enlarged. That is, there is the possibility that the held portion cannot become a non-defective product. This disadvantage can be however eliminated when the supporting pipe is held. Although the supporting pipe may be welded to only one end, the supporting pipe may be preferably welded to each of opposite ends. The viscosity of the glass material is in a range of from $10^3$ Pa·s to $10^{10.2}$ Pa·s when the diameter of the hole of the glass material is enlarged. It is therefore preferable that the viscosity of the supporting pipe is selected to be in the same range so that the piercing plug can be pressed into the glass material without the supporting pipe self-deformed.

If the supporting pipe and the glass material are welded to each other while being concentric with each other in the condition that the inner diameter of the supporting pipe is selected to be substantially equal to the inner diameter of the glass tube obtained after enlargement of the hole of the glass material, the supporting pipe functions as a guide for the piercing plug when the piercing plug is inserted into the glass material. In this manner, the center axis of the piercing plug can be made coincident with the center axis of the glass material easily, so that eccentricity can be reduced easily. The term "eccentricity" used herein means a value expressed as a percentage of the distance between the center of the outer circumference of the glass tube and the center of the inner circumference of the glass tube in a section perpendicular to the axis of the glass tube to the outer diameter of the glass tube.

The shape of the piercing plug may be changed as occasion demands. There may be used the piercing plug having a tapered end, and a cylindrical or columnar portion with a constant outer diameter starting from the middle of the piercing plug. If the softened glass material is cooled to a temperature at which the sectional shape of the glass material (the glass tube formed by the piercing plug) can be self-sustained, e.g., a temperature of not higher than 1500° C., preferably a temperature of not higher than 1000° C. while the softened glass material comes into contact with the cylindrical or columnar portion of the piercing plug, the hole formed in the glass material is prevented from being collapsed or non-circularly shaped when the piercing plug passes through the glass material. The length of the cylindrical or columnar portion of the piercing plug is decided according to the degree of cooling of the glass material.

The piercing plug is preferably supported by a support jig such as a support rod or the like. The support jig preferably has a gradient diameter portion whose outer diameter decreases gradually as the distance from the piercing plug increases. Because the support jig having the gradient diameter portion is provided, resistance acting on the piercing plug can be entirely absorbed to the support jig and can disperse force to thereby prevent the force from acting on the central portion of the support jig. Accordingly, when the diameter of the hole of the glass material is enlarged, the hole can be restrained from becoming eccentric due to deflection of the support jig.

Figure 10A:
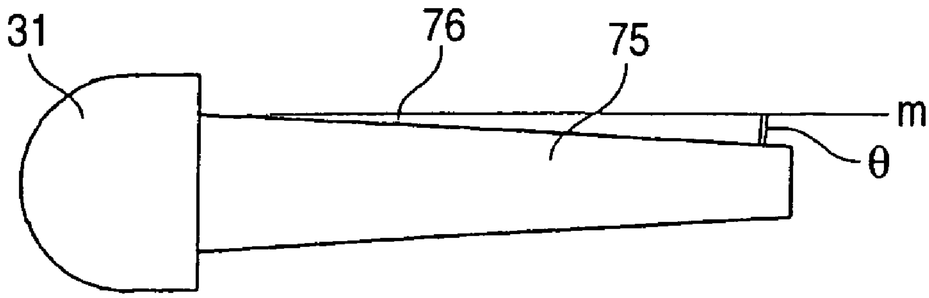
FIG. 10(*a*) and FIG. 10(*b*) are views for explaining shapes of a support jig.
Figure 10B:
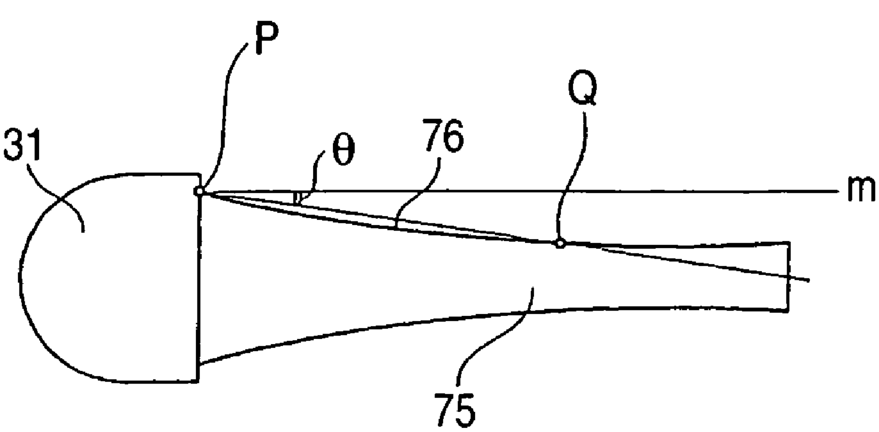

The gradient diameter portion 76 may have a side surface shaped like a straight line as shown in FIG. 10(*a*) or like a curve as shown in FIG. 10(*b*) in a section including the axis of the support jig 75. The angle θ of the gradient diameter portion 76 with respect to a line m parallel to the axis of the support jig may be preferably selected to be in a range of from 0.1 degrees to 10 degrees, both inclusively. When the gradient diameter portion 76 is expressed in straight line as shown in FIG. 10(*a*), the angle θ between the straight line and the line m is preferably selected to be in the aforementioned range. When the gradient diameter portion is expressed in curve as shown in FIG. 10(*b*), the angle θ between a straight line connecting a start point P of reduction in diameter and an end point Q of reduction in diameter in the sectional view and the line m is preferably selected to be in the aforementioned range.

The support jig 75 may be fixed to each of opposite ends of the piercing plug 35.

Preferably, a positioning dent configured to allow the piercing plug to be guided to a predetermined position is provided in an end surface of the columnar or cylindrical glass material so that a piercing plug can be made to abut on the positioning dent to start enlargement of the diameter of the hole in the glass material.

Figure 11A:
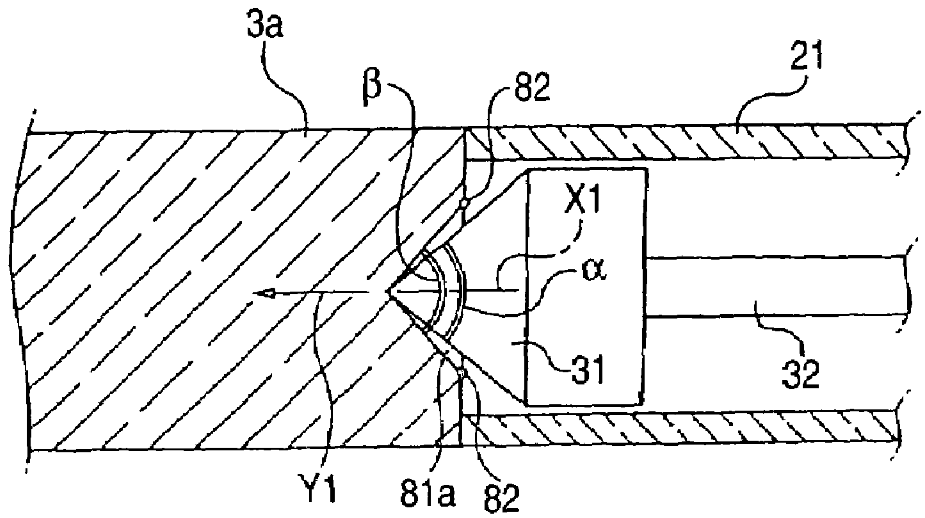
FIG. 11 is a view for explaining abutment between a piercing plug and a positioning dent, in which FIG. 11(*a*) is a view in the case of a columnar glass material, and FIG. 11(*b*) is a view in the case of a cylindrical glass material.
Figure 11B:
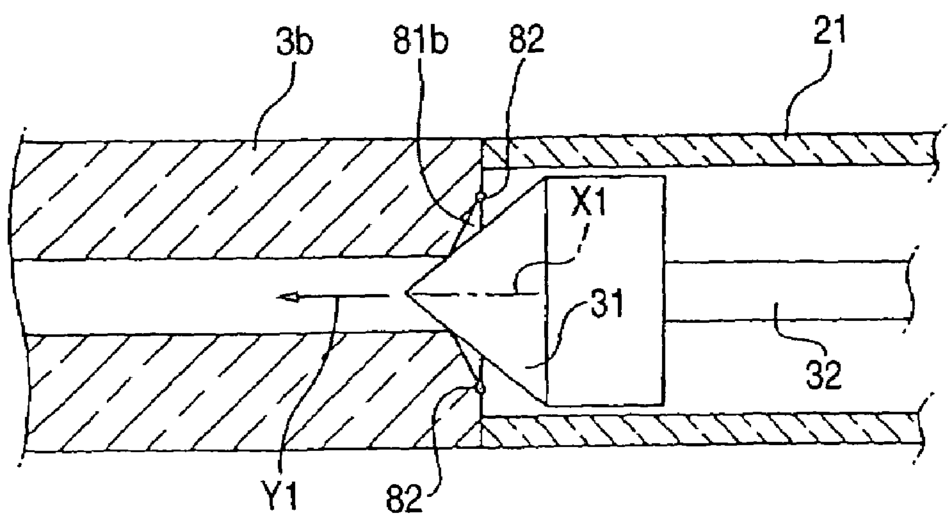
Figure 12:
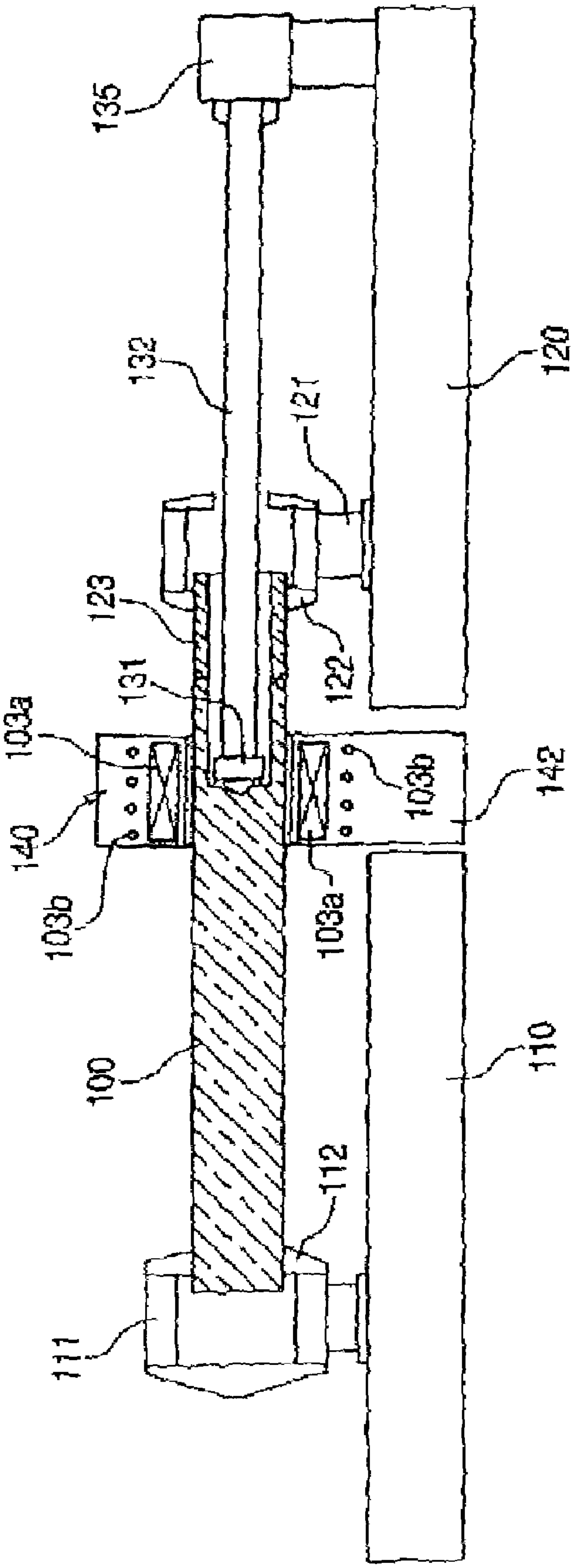
FIG. 12 is a view for explaining a conventional method for manufacturing a glass tube.

For example, as shown in FIG. 11(*a*), the positioning dent 81*a* is provided in the exit side end surface of the columnar glass material 3*a*. Alternatively, as shown in FIG. 11(*b*), the positioning dent 81*b* is provided in the exit side end surface of the cylindrical glass material 3*b*. The glass material 3*a* (3*b*) is welded to the supporting pipe 21 at its exit side end surface. The piercing plug 31 abuts on the glass material 3*a* (3*b*) while being supported by the support rod 32. The piercing plug 31 first abuts on the positioning dent 81*a* (81*b*), so that sliding in a direction perpendicular to the axis of the glass material 3*a* (3*b*) is limited. Accordingly, the hole opened or enlarged in terms of diameter is restrained from becoming eccentric when the glass material 3*a* (3*b*) is pierced. The positioning dent 81*a* (81*b*) is preferably configured so that the piercing plug 31 can be guided by the positioning dent 81*a* (81*b*) to make the axis of the piercing plug 31 coincident with the axis of the glass material 3*a* (3*b*).

The positioning dent 81*a* shown in FIG. 11(*a*) is shaped like a cone the vertex of which is located at the bottom of the dent. The direction Y1 of piercing the glass material 3*a* is set as a direction of the center axis of the glass material 3*a*. The bottom of the positioning dent 81*a* abuts on the vertex of the piercing plug 31. The angle β of aperture of the positioning dent is selected to be higher than the vertical angle α of the piercing plug. Since the piercing plug 31 does not abut on an aperture end circle 82 of the positioning dent when guided by the positioning dent 81, the axis X1 of the piercing plug can be made coincident with the piercing direction Y1 easily regardless of the surface condition of the exit side end surface of the glass material 3*a* as shown in FIG. 11(*a*). The positioning dent 81*b* shown in FIG. 11(*b*) can guide the piercing plug 31 in the same manner as described in FIG. 11(*a*) except that the positioning dent 81*b* is shaped like a truncated cone.

The positioning dent may be shaped like a column but a tapered shape may be preferably used. Examples of the tapered shape include a truncated cone, a truncated polygonal pyramid, part of a spherical surface or a flattened spherical surface, a curved surface generated by revolution of a curved generatrix, and so on.

(First Embodiment)

The first embodiment will be described as an embodiment in which an internal or external pressure of a glass tube is controlled to thereby control respective stresses exerted on inner and outer circumferential sides of the glass tube when a piercing plug is pressed into a glass material.

As shown in FIG. 1, a glass tube manufacturing apparatus 1 used in this embodiment has a heating furnace 40 for heating a glass rod 3, an entrance side base 10 disposed on an entrance side of the heating furnace 40, and an exit side base 20 disposed on an exit side of the heating furnace 40.

A dummy pipe 4 (supporting pipe) made of glass is connected to one end of the glass rod 3 which is to be pierced.

A first feed table 11 capable of being slid left and right in the drawing at a desired speed is provided on the entrance side base 10. The first feed table 11 is configured so that a piercing-terminating end side of the glass rod 3 can be grasped by a first chuck 12 and that the glass rod 3 can be rotated about its longitudinal axis.

A second feed table 21 capable of being slid left and right in the drawing in the same manner as the first feed table 11 is provided on the exit side base 20. The moving speed of the second feed table 21 is appropriately controlled in accordance with the moving speed of the first feed table 11. The second feed table 21 is configured so that one end of the dummy pipe 4 connected to a piercing-starting end side of the glass rod 3 can be grasped by a second chuck 22 and that the glass rod 3 can be rotated about its longitudinal axis. The rotation of the second feed table 21 can be controlled to be synchronized with the rotation of the first feed table 11 or to be made different from the rotation of the first feed table 11.

A fixing member 35 for fixing a support rod 32 is further provided on the exit side base 20. The support rod 32 is fixed to the piercing plug 31 and fixed to the fixing member 35. The support rod 32 has such a center axis that the support rod 32 is concentric with the piercing plug 31. The support rod 32 is supported so that the center axis of the support rod 32 is made coincident with the center axis of the glass rod 3.

The piercing plug 31 is made of a material allowed to be used at the softening temperature of the glass rod 3 but substantially incapable of chemically reacting with the glass rod 3. Preferably, the piercing plug 31 is made of black lead (graphite). Black lead is excellent in stability at a high temperature for softening glass and has high electric conductivity.

Although the amount of impurities contained in ordinary black lead is about 400 ppm, it is desirable that high-purity black lead is used for the piercing plug 31 in this embodiment. More desirably, the impurity content is selected to be not higher than 1 ppm. As a result, the amount of impurities moved from the piercing plug 31 into the glass rod 3 can be reduced when the piercing plug 31 is pressed into the glass rod 3.

The piercing plug 31 is further desirably surface-coated so that at least part of the piercing plug 31 being contact with glass contains any one of silicon carbide (SiC), pyrolytic carbon (PyC) and metal carbide. Incidentally, for example, niobium carbide (NbC), tantalum carbide (TaC), titanium carbide (TiC) and zircon carbide (ZrC) can be listed as preferred materials for the metal carbide.

As a surface-coating method, for example, a coating layer of silicon carbide or the like as described above may be formed on a surface of the piercing plug 31 so that oxidization at a high temperature can be prevented while both strength and wear resistance can be improved. Furthermore, the surface coating makes it possible to keep the surface of the piercing plug 31 highly pure and to prevent impurities from diffusing from the inside of the piercing plug 31 into the glass rod 3. The use of a black lead material having a higher surface hardness is also effective in improving both strength and wear resistance.

The heating furnace 40 in this embodiment is a high frequency induction heat type furnace in which heat is generated by a heating element 41 when an alternating current is passed through a coil 42. The heating element 41 is made of black lead, which is cylindrically shaped and with which the neighborhood of an abutment portion between the glass rod 3 and the piercing plug 31 is covered. The heating element 41 generates heat to a temperature equal to or higher than the softening point of the glass to thereby heat and soften the glass rod 3.

Incidentally, in the case of a high-purity glass material produced by a VAD method or the like, the softening point is about 1700° C.

Next, a configuration for controlling an internal or external pressure of the glass tube at the time of the formation of the glass tube will be described.

Figure 2A:
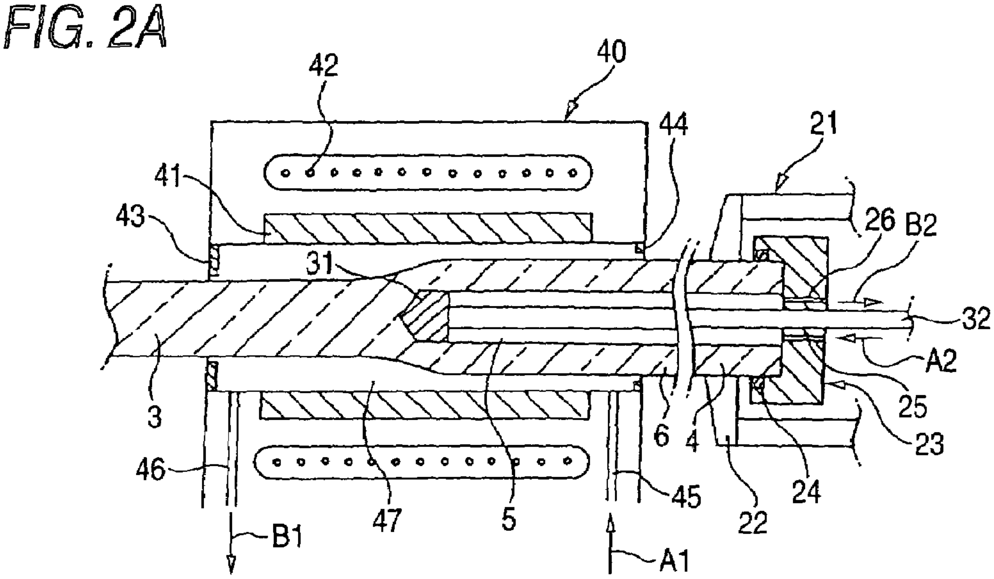
FIG. 2(*a*) is a view for explaining control of barometric pressures on an inner circumferential side and an outer circumferential side of the glass tube.
Figure 2B:
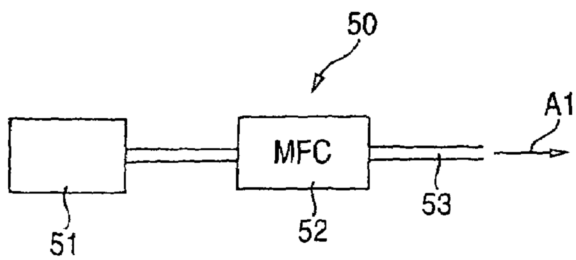
Figure 2C:
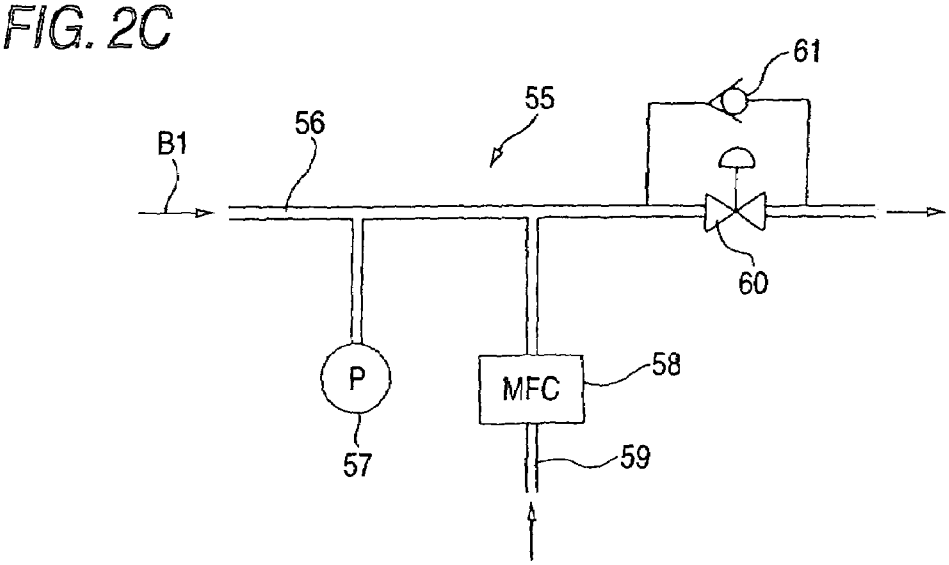

As shown in FIG. 2(*a*), an air supply hole 45 and an air discharge hole 46 that communicate with a space 47 in which the glass rod 3 is heated are formed in the heating furnace 40. The air supply hole 45 is connected to an air supply portion 50 shown in FIG. 2(*b*). The air discharge hole 46 is connected to an air discharge portion 55 shown in FIG. 2(*c*). It is preferable to perform forced evacuation using a vacuum pump or the like.

The air supply portion 50 supplies a gas to a supply pipe 53 from a gas supply portion 51 for supplying a desired kind of gas through a mass flow controller (hereinafter referred to as MFC) 52. The supply pipe 53 is connected to the air supply hole 45 to supply the desired gas toward the space 47 (in the direction of the arrow A1). It is preferable that the gas supplied here has no bad influence on the quality of the formed glass tube 6. For example, an inert gas such as nitrogen, argon, or the like, may be used.

The air discharge portion 55 discharges the gas in the space 47 (in the direction of the arrow B1) from an air discharge pipe 56 connected to the air discharge hole 46. A pressure gage 57, an MFC 58 and a mechanical damper 60 are provided in streaming order in the air discharge portion 55.

The pressure gage 57 monitors the pressure of the gas discharged from the space 47 to the air discharge pipe 56. The pressure measured by the pressure gage 57 is substantially equal to the internal pressure of the space 47. The MFC 58 controls the flow rate of the gas discharged from the space 47 to the mechanical damper 60 on the basis of a required amount of surplus air introduced through an introduction pipe 59 suitably. That is, the flow rate of the gas flowing in the mechanical damper 60 is the sum of the amount of the gas discharged from the space 47 and the amount of the surplus air introduced from the MFC 58. The flow rate in the mechanical damper 60 is set so that a desired air discharge amount set in advance can be obtained. The mechanical damper 60 has an relief valve 61 provided to prevent the upstream side from being pressurized abnormally.

The air supply portion 50 and the air discharge portion 55 configured as described above are further configured so that the MFCs 52 and 58 and the pressure gage 57 can be controlled by a single control system. Thus, the MFCs 52 and 58 can be controlled with reference to the pressure measured by the pressure gage 57 to thereby control both the amount of gas supplied to the space 47 and the amount of gas discharged from the space 47. Accordingly, the pressure of the space 47 can be controlled to have a desired value.

Sealing portions 43 and 44 by which the space 47 is formed are provided at the entrance and the exit of the heating furnace 40 respectively. Each sealing portion 43 (44) is of a non-contact type and is configured so that a very small gap is provided between the glass rod 3 (pierced glass tube 6) and the sealing portion 43 (44). A gas is jetted toward the glass rod 3 or the glass tube 6 so that the gap between the heating furnace 40 and the glass rod 3 or the glass tube 6 is sealed with the gas. In order to stabilize the barometric pressure of the space 47, control is preferably performed so that the barometric pressure of the space 47 becomes a positive pressure compared with the barometric pressure of the external space of the induction heating furnace 40.

As shown in FIG. 2(*a*), a cap 23 is attached to the end portion of the dummy pipe 4 grasped by the second chuck 22. The cap 23 is configured to be fixed to the support rod 32 of the piercing plug hermetically so that the cap 23 cannot rotate relative to the support rod 32 but can rotate relative to the dummy pipe 4 in a hermetically closed state between the cap 23 and the dummy pipe 4 through an O-ring 24.

An air supply hole 25 and an air discharge hole 26 that communicate with the hole 5 of the glass tube 6 are formed in the cap 23. The air supply hole 25 and the air discharge hole 26 are connected to an air supply portion and an air discharge portion equivalent in configuration to the air supply portion 50 shown in FIG. 2(*b*) and the air discharge portion 55. Thus, gas a flow rate of which is controlled to have a required value is supplied from the air supply hole 25 into the hole 5 (in the direction of the arrow. A2) whereas gas a flow rate of which is controlled to have a required value is discharged from the hole 5 through the air discharge hole 26 (in the direction of the arrow B2).

Accordingly, the internal pressure of the hole 5 can be controlled to have a desired value in the same manner as that of the aforementioned space 47. The internal pressure of the hole 5 may be either positive pressure or negative pressure (including vacuum).

For the production of the glass tube in this embodiment, in the condition that the air supply and air discharge portions are operated, as shown in FIG. 2(*a*), the glass rod 3 fed into the heating furnace 40 is heated and softened by heat generated by the heating element 41 and the piercing plug 31 is pressed into the softened region of the glass rod 3 to pierce the glass rod 3 gradually to thereby form the glass tube 6.

In this manner, when the piercing plug 31 is pressed into the glass rod 3, the internal and external pressures of the glass tube 6 can be controlled to control stresses exerted on the inner and outer circumferential sides of the glass tube 6 respectively. Accordingly, the internal and external pressures can be made to act on the glass tube 6 just after piercing so that the shape of the glass tube 6 is sustained. Thus, required inner and outer diameters of the glass tube 6 can be obtained accurately.

The internal and external pressures of the glass tube 6 may be preferably controlled so that the deviation between the internal and external pressures is kept substantially constant. Particularly when controlling is made so that variation in the barometric pressure deviation between the internal and external pressures is not higher than 13.3 Pa, a glass tube 6 having a uniform shape in the longitudinal direction can be obtained easily.

A control system for controlling the barometric pressure of the space 47 and a control system for controlling the barometric pressure of the hole 5 may be operated in accordance with respective set values independently or may be linked with each other to perform control to adjust the barometric pressure deviation between the internal and external pressures.

(Second Embodiment)

The second embodiment will be described as an embodiment in which each of stresses exerted on the inner and outer circumferential sides of the glass tube is controlled by inductively heating the piercing plug to a temperature equal to or higher than the softening point of the glass rod when the piercing plug is pressed into the glass rod.

The glass-tube manufacturing apparatus used in this embodiment is substantially the same in configuration as the glass tube manufacturing apparatus 1 shown in FIG. 1. Main part of this embodiment will be described with reference to FIG. 3.

Figure 3:
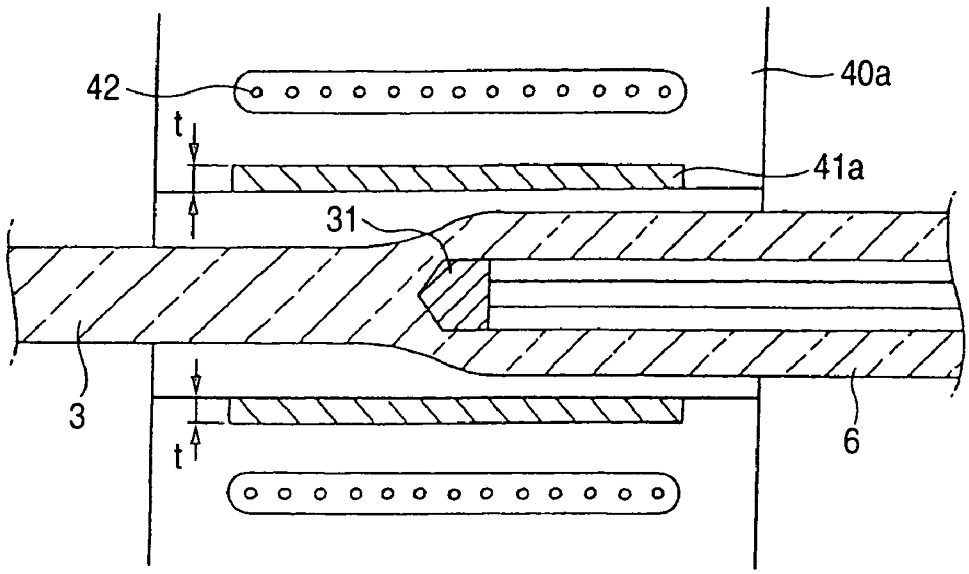
FIG. 3 is a view of main part for explaining a second embodiment.

As shown in FIG. 3, a heating furnace 40*a* used in this embodiment is formed so that the thickness t of a heating element 41*a* is smaller than that of an ordinary heating element.

In induction heating, the induced current density generated in a member to heat is the highest at the coil side surface of the member and decreases as the location goes from the coil side surface toward the inside of the member (this is referred to as skin effect). That is, in an ordinary induction heating furnace, an induced current is generated only in the heating element of the heating furnace but no induced current is generated in the piercing plug located inside the heating element.

In this embodiment, the use of the heating element 41*a* thinner than the ordinary heating element makes it possible to generate an induced current also in the piercing plug 31 disposed inside the heating element 41*a*, so that the piercing plug 31 is positively inductively heated.

The skin effect of induction heating is determined on the basis of the electric resistance and relative magnetic permeability of the member to heat and the frequency of the alternating current applied to the coil. In general, the distance at which the current density is attenuated to 36.7% when the current density at the coil side surface of the member to heat is regarded as 1 is defined as a depth 6 of penetration of the current. The depth δ (cm) of penetration can be expressed by the [equation 1]:

$$\sigma=5.030(\rho/\mu f)^{1/2} \qquad \text{(Equation 1)}$$

in which ρ (Ωcm) is the electric resistance of the member to heat, $\mu$ is the relative magnetic permeability of the member to heat, and f (Hz) is the frequency of the alternating current.

As expressed by the [Equation 1], the depth of penetration of the induced current into the member to heat increases as the frequency of the alternating current decreases and increases as the electric resistance of the member to heat increases.

In an ordinary induction heating furnace, the frequency of the alternating current applied to the coil is about 40 kHz. In this embodiment, however, a frequency of 10 kHz or lower is used. As a result, the depth of penetration of the induced current increases, so that the induced current can be generated not only in the heating element 41*a* but also in the piercing plug 31 to heat the piercing plug 31 positively inductively.

At least one of the heating element 41*a* and the piercing plug 31 may be formed to have a required electric resistance value so that the induced current can be easily generated in the piercing plug 31. When, for example, the heating element 41*a* is made of porous black lead, the electric resistance value of the heating element 41*a* becomes high. As a result, the depth of penetration of the induced current increases so that the induced current can be easily generated in the piercing plug 31.

As described above, in this embodiment, one or more method among the method of reducing the thickness t of the heating element 41*a*, the method of reducing the frequency of the alternating current and the method of setting the electric resistances of the heating element 41*a* or the piercing plug 31 optionally are selectively employed so that both the heating element 41*a* and the piercing plug 31 are heated to a temperature equal to or higher than the softening point of glass. When, for example, the frequency of the alternating current is reduced as well as the thickness t of the heating element 41*a* is reduced, the piercing plug 31 can be effectively inductively heated.

On this occasion, the temperature of the piercing plug 31 is measured by a non-contact type radiation thermometer or by a thermo couple directly provided on the piercing plug 31. The thickness t of the heating element 41*a* and the electric power of the alternating current applied to the coil 42 are set so that the temperature of the inner circumferential side of the glass tube 6 becomes substantially equal to the temperature of the outer circumferential side of the glass tube 6 when the glass tube 6 is formed.

As a result, when the glass tube 6 is cooled from the softening temperature after piercing, variation in internal stress caused by the temperature difference between the inner and outer circumferential sides of the glass tube 6 can be reduced to restrain the shape of the glass tube 6 from being distorted.

Furthermore, unlike the conventional case, the glass tube 6 is not cooled by the piercing plug. Accordingly, heating efficiency is improved so that the electric power for passing the alternating current through the coil 42 can be used effectively.

(Third Embodiment)

The third embodiment will be described as an embodiment for inductively heating the piercing plug to a temperature equal to or higher than the softening point of the glass material in the same manner as in the aforementioned second embodiment.

Figure 4:
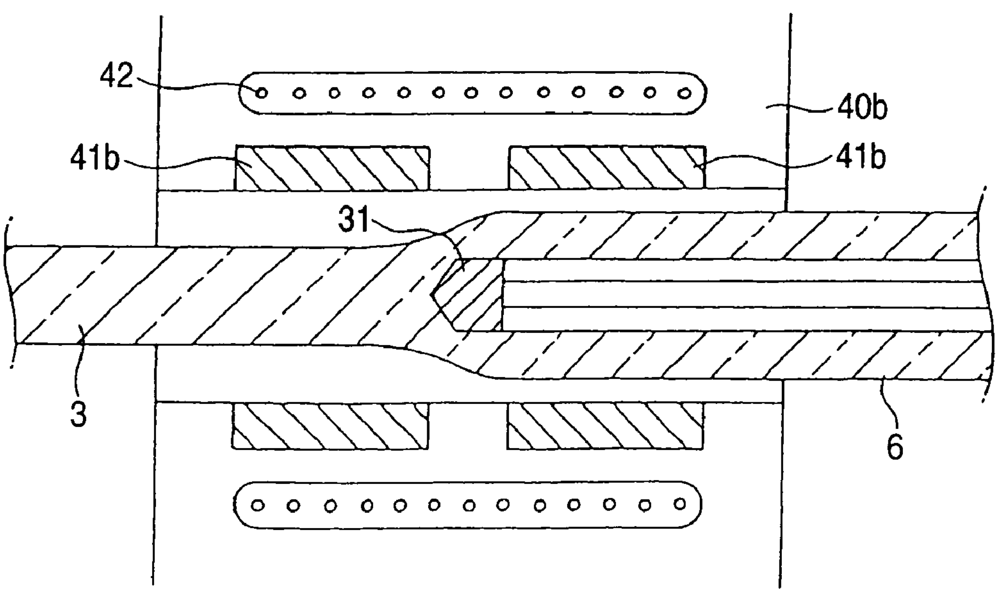
FIG. 4 is a view of main part for explaining a third embodiment.

As shown in FIG. 4, a heating furnace 40*b* used in this embodiment is formed so that the heating element is divided into two parts 41*b* in the piercing direction of the glass rod 3. When the piercing plug 31 is disposed at a gap formed between the heating element parts 41*b*, magnetic flux generated by the coil 42 can be made to directly act on the piercing plug 31. Accordingly, the piercing plug 31 can be exclusively inductively heated to a temperature equal to or higher than the softening point.

Accordingly, when the glass tube 6 is formed, the temperature of the inner circumferential side of the glass tube 6 can be made substantially equal to the temperature of the outer circumferential side of the glass tube 6 to thereby restrain the shape of the glass tube 6 from being distorted, in the same manner as that in the second embodiment.

(Fourth Embodiment)

The fourth embodiment will be described as an embodiment in which a resistance heating method is used for heating the piercing plug to a temperature equal to or higher than the softening point of the glass material.

Figure 5:
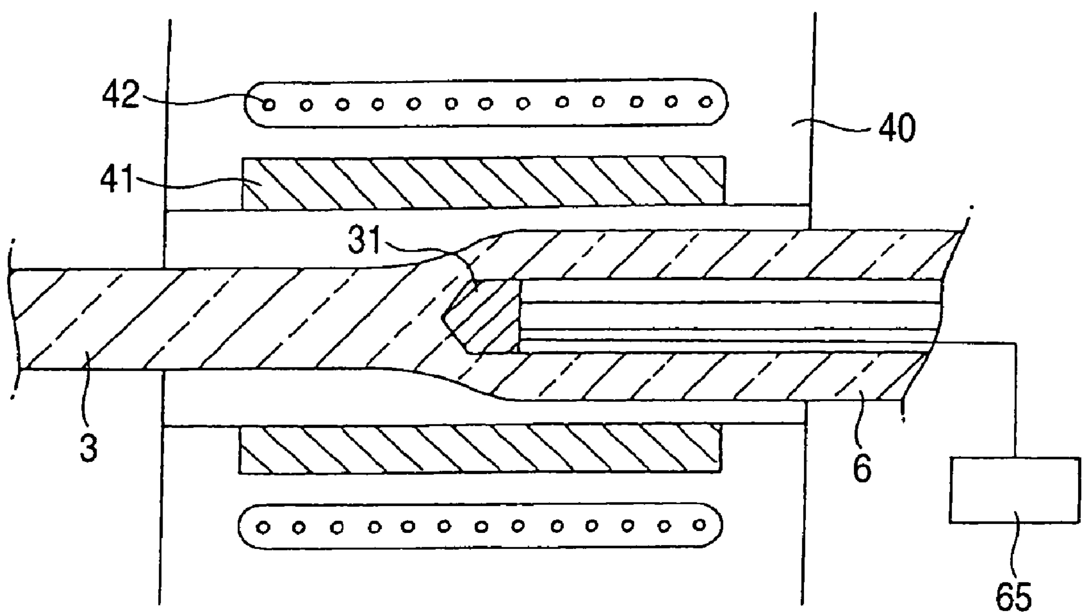
FIG. 5 is a view of main part for explaining a fourth embodiment.

As shown in FIG. 5, a heating furnace used in this embodiment has the configuration for heating the glass rod 3 to be the same as the heating furnace 40 described in the first embodiment. On the other hand, a power supply 65 for passing a current through the piercing plug 31 is connected to the piercing plug 31. Since the piercing plug 31 is made of a material mainly containing carbon as described above, Joule heat can be generated for resistance heating when a current is passed through the piercing plug 31.

Such a configuration makes it possible to control the heating temperature of each of the heating element 41 of the heating furnace 40 and the piercing plug 31 to thereby make the temperature of the inner circumferential side of the glass tube 6 substantially equal to the temperature of the outer circumferential side of the glass tube 6 when the glass tube 6 is formed. Accordingly, when the glass tube 6 is cooled, stresses exerted on the inner and outer circumferential sides of the glass tube 6 can be controlled to restrain the glass tube 6 from being deformed.

(Fifth Embodiment)

This embodiment will be described as an embodiment in which the pressure at which the piercing plug is relatively pressed into the glass material is detected and a detection signal of the pressure is fed back so that the quantity of heat generated by the heating element is controlled to keep the pressure constant.

Figure 6:
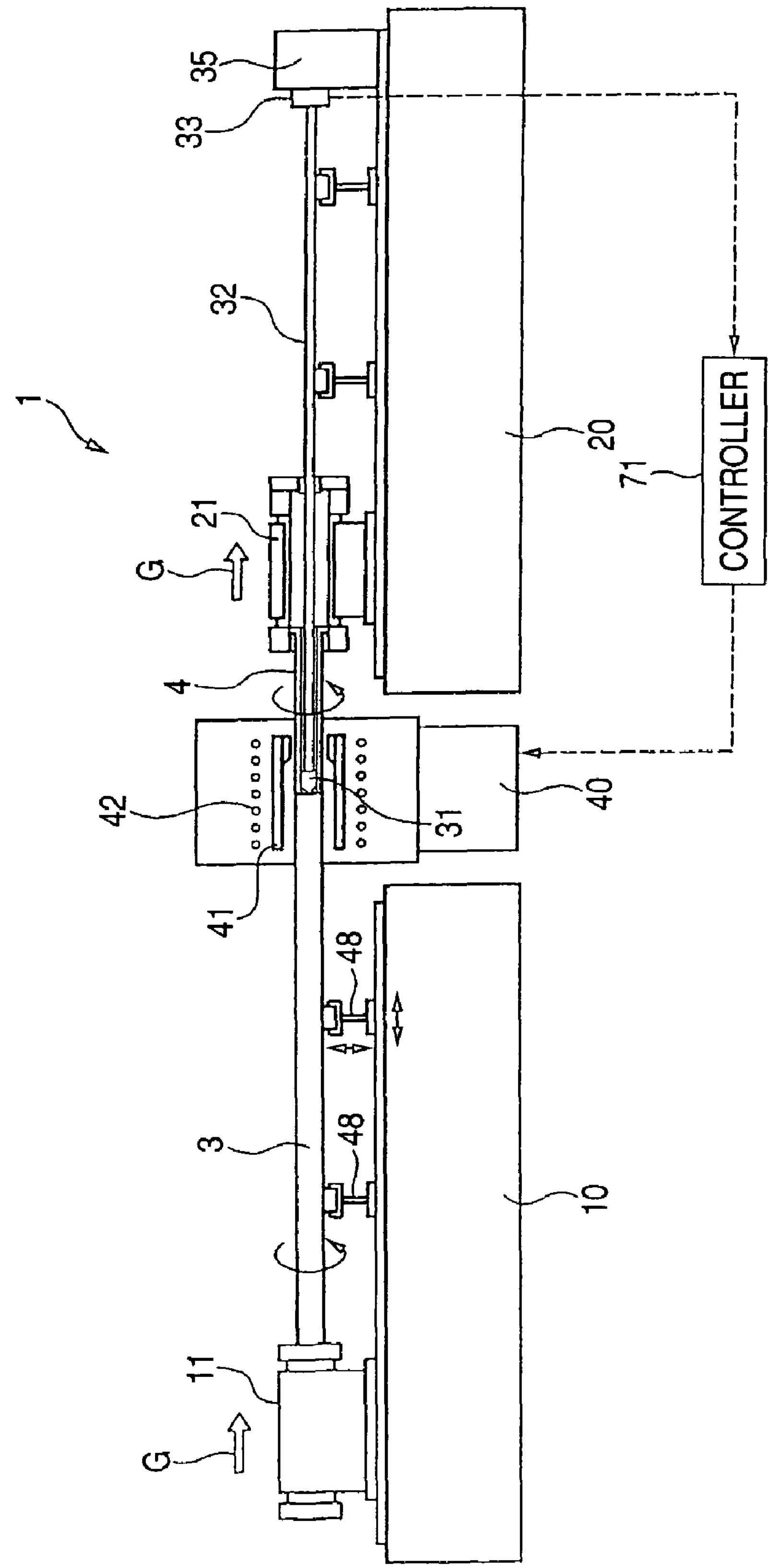
FIG. 6 is a view for explaining a fifth embodiment.

FIG. 6 shows a glass tube manufacturing apparatus 1 according to this embodiment. A high frequency induction furnace is used as the heating furnace 40 that is heating means for softening and processing the glass material. The heating furnace 40 is connected to a controller 71 (the arrow G shows a direction of carrying the glass rod 3).

Figure 7:
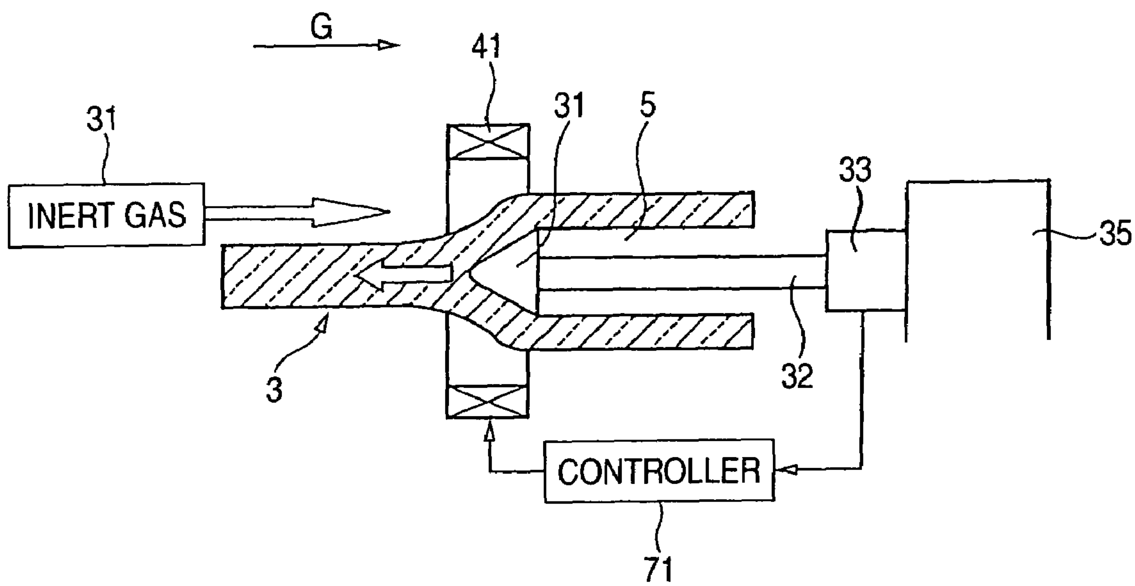
FIG. 7 is a view showing main part of a glass tube manufacturing apparatus according to the fifth embodiment.

As shown in FIG. 7, a load cell 33 as pressure detecting means is mounted between the support rod 32 fixed to a rear end of the piercing plug 31 and the fixing table 35. The load cell 33 is connected to the controller 71.

The first feed table 11 as moving means that grasps the glass rod 3 as a glass material moves on the entrance side base 10 to feed the glass material 3 into the heating element 41. As a mechanism for moving the first feed table 11, there can be given an example in which a ball screw is provided on the entrance side base 10 whereas a ball nut is formed in the first feed table 11 so that the ball screw thread-engaged with the ball nut is rotated by a motor or the like to move the first feed table 11 on the entrance side base 10. Incidentally, support rollers 48 may be provided in an intermediate position to stabilize the attitude of the glass rod 3. The position of each support roller 48 can be adjusted in the up-and-down direction and in the left-and-right direction in the drawing (this also applies to a sixth embodiment).

Next, a glass tube manufacturing method using the aforementioned glass tube manufacturing apparatus 1 will be described.

When an end of the glass rod 3 is softened in the heating furnace 40, the first feed table 11 is moved toward the heating furnace 40 to feed the glass rod 3 at a constant speed. At this time, as shown in FIG. 7, the end of the glass rod 3 is pressed outward (toward the outer circumference side) and enlarged by the piercing plug 31, so that the hole 5 is provided in the end of the glass rod 3.

Incidentally, as the glass rod 3 is carried in, an inert gas such as $N_2$, Ar, or the like is supplied into the heating furnace 40 in the direction of carrying the glass rod 3 (the direction of the arrow G).

The pressure at which the glass rod 3 is carried in and pressed against the piercing plug 31 is detected by the load cell 33 through the support rod 32 and fed back to the controller 71.

When the pressure fed back thus is lower than a predetermined pressure, the controller 71 judges that the glass rod 3 is over-softened, and reduces the quantity of heat generated by the heating element 41 to decrease the temperature of the heating furnace 40. On the other hand, when the pressure is higher than the predetermined pressure, the controller 71 judges that the glass rod 3 is under-softened, and increases the quantity of heat generated by the heating element 41 to increase the temperature of the heating furnace 40.

(Sixth Embodiment)

Figure 8:
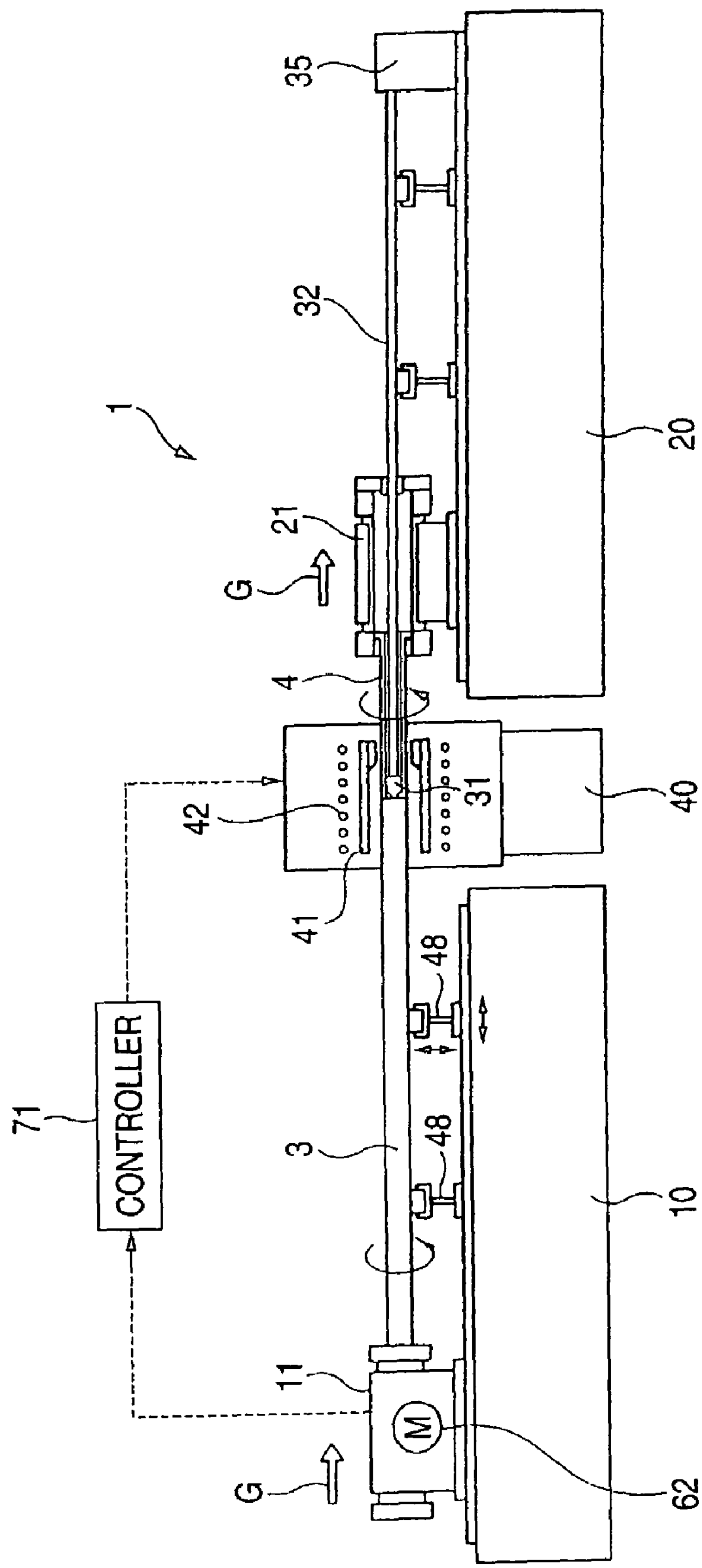
FIG. 8 is a view for explaining a sixth embodiment.

FIG. 8 shows a glass tube manufacturing apparatus 1 according to the sixth embodiment. In the manufacturing apparatus 1, the first feed table 11 is self-propelled by a motor 62. Numerical values such as a current, a voltage, etc., supplied to the motor 62 are detected by the controller 71. In the case where the detected current or voltage value is lower than a predetermined value when the first feed table 11 feeds the glass rod 3 into the heating furnace 40 at a constant speed, the controller 71 judges that the glass rod 3 is over-softened, and decreases the temperature of the heating furnace 40 (incidentally, the arrow G indicates the direction of carrying the glass rod 3).

On the other hand, when the detected current or voltage value is higher than the predetermined value, the controller 71 judges that the glass rod 3 is under-softened, and increases the temperature of the heating furnace 40. In this manner, the softened state of the glass rod 3 can be detected on the basis of the detected current or voltage value of the driving motor 62 of the first feed table 11. Accordingly, feedback control for increasing or decreasing the temperature of the heating furnace 40 can be carried out by the controller 71 according to the detected current or voltage value so that the softened state of the glass rod 3 fed into the heating furnace 40 can be always kept constant.

(Seventh Embodiment)

Figure 9A:
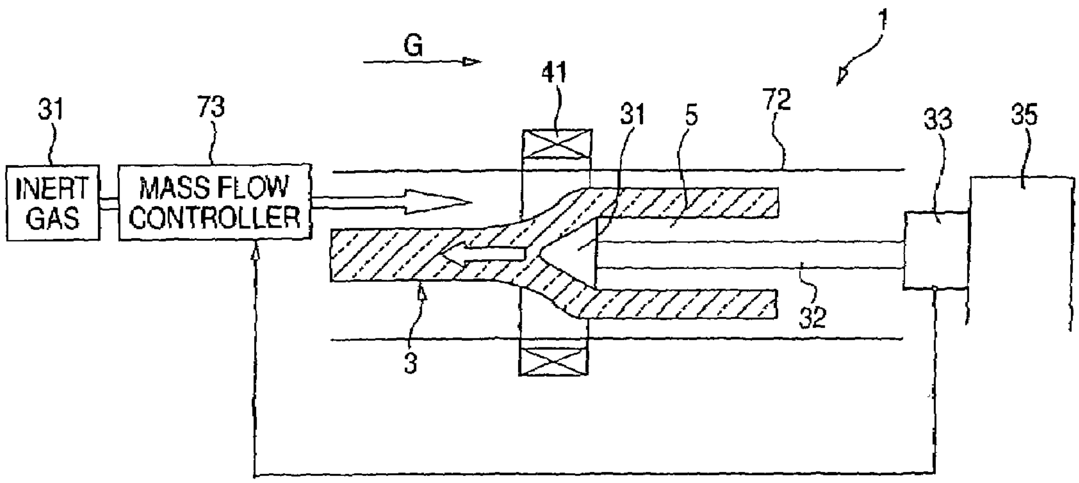
FIG. 9 is a view of main part of a glass tube manufacturing apparatus having a mass flow controller according to a seventh embodiment.
Figure 9B:
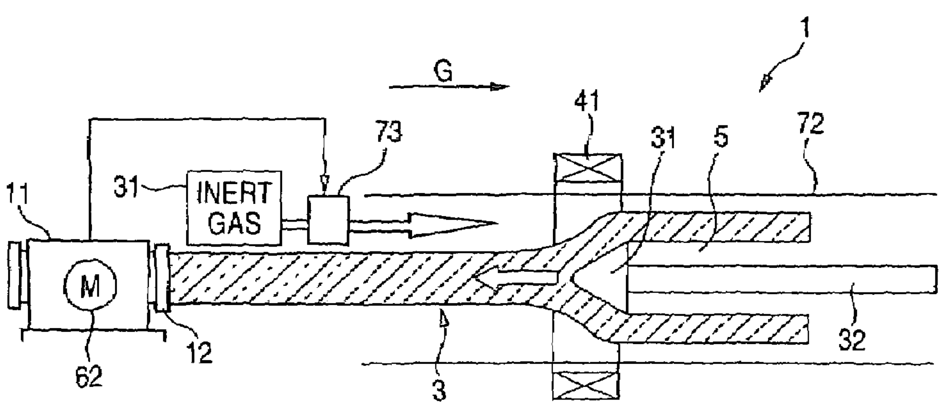

As shown in FIGS. 9A and 9B, a glass tube manufacturing apparatus 1 according to the seventh embodiment has a mass flow controller 73. A muffle tube 72 is disposed in a heating furnace 31 of the manufacturing apparatus 1. The glass tube is manufactured in the muffle tube 72. An inert gas (e.g., helium etc. high in thermal conductivity) is introduced into the muffle tube 72 through the mass flow controller 73 in the direction of carrying the glass rod 3 (the direction of the arrow G). The softened state of the glass rod 3 disposed in the muffle tube 72 is judged from the load cell 33 connected to the aforementioned support rod 32 (in FIG. 9A), the current or voltage value of the motor 62 for driving the first feed table 11 (in FIG. 9B), or the like. When the temperature of the muffle tube 72 in the vicinity of the heating element 41 needs to be slightly increased or decreased in order to keep the softened state of the glass rod 3 in a desired state, the flow rate of the inert gas introduced into the muffle tube 72 is controlled to make the temperature control possible. When the glass rod 3 is slightly over-softened compared with the desired state, the mass flow controller 73 is controlled to increase the flow rate of the inert gas to make it possible to decrease the temperature of the atmosphere in the muffle tube 72 slightly. When a slight temperature increase is required, the flow rate of the inert gas is decreased by the mass flow controller 73 to make it possible to increase the temperature of the atmosphere slightly.

According to the aforementioned fifth through seventh embodiments, since the glass rod can be always pierced at constant viscosity, stress exerted on the inner circumference of the glass tube can be controlled to prevent variations in residual stress and dimensions. Accordingly, it is possible to avoid the problem that cracks are apt to occur at the time of reheating because residual stress after cooling is distributed or that lengthwise characteristic varies after fiber formation because dimensional accuracy after processing deteriorates. When the glass material is carried into the heating furnace, the quantity of the inert gas supplied between the heating furnace and the glass material can be controlled simultaneously to thereby attain improvement in the response and precision of control.

Incidentally, the method and the apparatus for manufacturing a glass tube according to the invention is not limited to the aforementioned embodiments and changes, modifications, etc., may be made suitably. For example, when a motor, a ball nut, a ball screw, and the like, are provided for moving the first feed table, detection means for detecting the current or voltage supplied to the motor may be provided so that the pressure can be judged from consumed electric power.

In the invention, the first through seventh embodiments maybe implemented in combination. When, for example, the first and second embodiments are combined so that the internal and external pressures of the glass tube and the temperature of the glass tube are controlled simultaneously, the shape of the glass tube can be more effectively prevented from being distorted.

Although the aforementioned embodiments have been described on the case where a glass rod as a columnar glass material is pierced, the method for manufacturing a glass tube according to the invention may be also applied to the case where the inner diameter of the hole of a glass pipe as a cylindrical glass material is enlarged.

INDUSTRIAL APPLICABILITY

By the method and the apparatus for manufacturing a glass tube according to the invention, a high-quality glass tube can be obtained because the glass tube can be prevented from being deformed just after piercing. It is also possible to solve the problem that cracks are apt to occur at the time of reheating because residual stress after cooling is distributed.

The glass tube manufactured according to the invention is preferred as a material of an optical fiber. For production of an optical fiber from the glass tube manufactured according to the invention, the glass tube is filled with glass layers formed on the inner surface of the glass tube so that an optical fiber preform having a central portion high in refractive index is obtained as a solid product. Alternatively, a core rod is inserted into the glass tube so that an optical fiber preform is obtained as a solid product. The optical fiber preform obtained thus is drawn to produce an optical fiber.

What is claimed is:

1. A method of manufacturing a glass tube, wherein stress exerted on an inner or outer circumferential side of said glass tube is controlled when a columnar or cylindrical glass material is heated and softened by a heating element disposed around said glass material and a piercing plug is relatively pressed into a softened region of said glass material to thereby form said glass material into said glass tube gradually, wherein said piercing plug has a tapered end, and a cylindrical or columnar portion with a constant outer diameter starting from the middle of said piercing plug, and said glass material is cooled to a temperature at which a sectional shape of said glass material is self-sustained while the softened glass material comes into contact with said columnar or cylindrical portion of said piercing plug inserted into said glass material.

2. A method of manufacturing a glass tube, wherein stress exerted on an inner or outer circumferential side of said glass tube is controlled when a columnar or cylindrical glass material is heated and softened by a heating element disposed around said glass material and a piercing plug is relatively pressed into a softened region of said glass material to thereby form said glass material into said glass tube gradually, wherein a positioning dent configured so that it can guide said piercing plug to a predetermined position is provided in an end surface of said columnar or cylindrical glass material, and said glass material begins to be formed into said glass tube gradually in the condition that said piercing plug is made to abut on said positioning dent.

3. A method of manufacturing a glass tube, wherein, when a columnar or cylindrical glass material is heated and softened by a heating element disposed around said glass material and a piercing plug is relatively pressed into a softened region of said glass material to thereby form said glass material into said glass tube gradually, a pressure at which said piercing plug is relatively pressed into the softened region of said glass material is detected and a detection signal is fed back for adjusting a quantity of heat generated by said heating element to keep said pressure constant.

4. The method of manufacturing a glass tube according to claim 3, wherein a supporting pipe is welded to at least one end of said columnar or cylindrical glass material so that said glass material is formed into said glass tube gradually while supported by said supporting pipe.

5. The method of manufacturing a glass tube according to claim 3, wherein said piercing plug has a tapered end, and a cylindrical or columnar portion with a constant outer diameter starting from the middle of said piercing plug, and said glass material is cooled to a temperature at which a sectional shape of said glass material is self-sustained while the softened glass material comes into contact with said columnar or cylindrical portion of said piercing plug inserted into said glass material.

6. The method of manufacturing a glass tube according to claim 3, wherein said glass material is formed into said glass tube gradually by said piercing plug which is supported by a support jig having a gradient diameter portion whose outer diameter gradually decreases as a distance from said piercing plug increases.

7. The method of manufacturing a glass tube according to claim 3, wherein a positioning dent configured so that it can guide said piercing plug to a predetermined position is provided in an end surface of said columnar or cylindrical glass material, and said glass material begins to be formed into said glass tube gradually in the condition that said piercing plug is made to abut on said positioning dent.

8. An apparatus for manufacturing a glass tube, comprising:

- a heating element disposed to surround said glass material;
- a piercing plug operable to be pressed into a softened region of said glass material to affect formation of said glass material into said glass tube;
- a pressure detecting unit operable to detect a pressure at which said piercing plug is pressed into said glass material; and
- a controller operable to control a quantity of heat generated by said heating element on the basis of a detection signal fed back from said pressure detecting unit to keep said pressure constant.

9. An apparatus for manufacturing a glass tube, comprising:

- a heating element disposed to surround a glass material;
- a piercing plug operable to be pressed into a softened region of said glass material to affect formation of said glass material into said glass tube;

- a first gas supply portion for supplying a gas to an exterior of said glass tube;
- a first gas discharge portion for discharging a gas from the exterior of said glass tube;
- a second gas supply portion for supplying a gas to an interior of said glass tube; and
- a second gas discharge portion for discharging a gas from the interior of said glass tube wherein said first and second gas supply portions and said first and second discharge portions are operable to control flow rate of said gas so that an internal or external pressure of said glass tube is controlled.

10. An apparatus for manufacturing a glass tube, comprising:

- a heating element disposed to surround a glass material;
- a piercing plug operable to be pressed into a softened region of said glass material to affect formation of said glass material into said glass tube;
- a feed table operable to be self-propelled by a motor at a desired speed and having a chuck for grasping a piercing-terminating end side of said glass material; and
- a controller operable to increase and decrease temperature of said heating element on the basis of a current or a voltage of said motor.

11. An apparatus of manufacturing a glass tube, comprising:

- a heating element including a muffle tube and disposed to surround a glass material;
- a piercing plug operable to be pressed into a softened region of said glass material to affect formation of said glass material into said glass tube;
- a pressure detecting unit operable to detect a pressure at which said piercing plug is pressed into said glass material; and
- a controller operable to control flow rate of a gas which is introduced into said muffle tube through a mass flow controller, on the basis of a detection signal fed back from said pressure detecting unit.

12. An apparatus for manufacturing a glass tube, comprising:

- a heating element including a muffle tube and disposed to surround a glass material;
- a piercing plug operable to be pressed into a softened region of said glass material to affect formation of said glass material into said glass tube;
- a feed table operable to be self-propelled by a motor at a desired speed and having a chuck for grasping a piercing-terminating end side of said glass material; and
- a controller operable to control flow rate of a gas which is introduced into said muffle tube through a mass flow controller, on the basis of a current or a voltage of said motor.

* * * * *